(12) United States Patent
Dougherty

(10) Patent No.: US 12,282,082 B2
(45) Date of Patent: Apr. 22, 2025

(54) METHOD AND APPARATUS FOR DETECTING BREATHING RADAR TARGETS

(71) Applicant: SRC, Inc., North Syracuse, NY (US)

(72) Inventor: John C. Dougherty, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 420 days.

(21) Appl. No.: 17/571,698

(22) Filed: Jan. 10, 2022

(65) Prior Publication Data

US 2023/0221426 A1    Jul. 13, 2023

(51) Int. Cl.
*G01S 13/56* (2006.01)
*G01S 7/41* (2006.01)

(52) U.S. Cl.
CPC .............. *G01S 13/56* (2013.01); *G01S 7/418* (2013.01)

(58) Field of Classification Search
CPC ................................. G01S 13/56; G01S 7/418
See application file for complete search history.

(56) References Cited

U.S. PATENT DOCUMENTS

| | | | | |
|---|---|---|---|---|
| 9,229,102 | B1* | 1/2016 | Wright | G01S 13/885 |
| 10,401,479 | B2* | 9/2019 | Mabrouk | G01S 13/52 |
| 2015/0301167 | A1* | 10/2015 | Sentelle | A61B 5/0205 342/22 |
| 2019/0183352 | A1* | 6/2019 | Regev | A61B 5/0816 |
| 2020/0146630 | A1* | 5/2020 | Joe | A61B 5/02438 |

FOREIGN PATENT DOCUMENTS

JP    2020115093 A  *  7/2020

OTHER PUBLICATIONS

F. Yang and Y. Su, "Vital signs detection via Dopper radar and CFAR in complex environment," 2017 Progress In Electromagnetics Research Symposium—Spring (PIERS), St. Petersburg, Russia, 2017, pp. 1721-1726, doi: 10.1109/PIERS.2017.8262027. (Year: 2017).*

* cited by examiner

*Primary Examiner* — Vladimir Magloire
*Assistant Examiner* — Noah Yi Min Zhu
(74) *Attorney, Agent, or Firm* — BOND, SCHOENECK & KING, PLLC; George R. McGuire

(57) ABSTRACT

A method for radar signal processing separates an electric signal generated by Doppler processors of a radar into alternating current (AC) magnitudes with Doppler frequencies corresponding to absolute values between 0.1 and 4 Hz and direct current (DC) magnitudes with no Doppler frequency. An AC line and a DC line are generated, based on the AC magnitudes and the DC magnitudes, respectively, by adding respective energies across Doppler cells for each range cell and subsequently applying CFAR detector algorithm respectively. An energy level difference between an energy spike in the AC line and another energy spike in the DC line is calculated and compared with a threshold set for detecting a breathing target that is stationary. If the energy level difference is greater than the threshold, the breathing target that is stationary is detected and reported to the radar operator.

12 Claims, 6 Drawing Sheets

METHOD AND APPARATUS FOR DETECTING BREATHING RADAR TARGETS

FIELD

Methods and apparatus for a radio detection and ranging system, and more particularly, methods and apparatus for detecting a breathing target.

BACKGROUND

Conventional Doppler radars use the Doppler effect to produce velocity data about objects at a distance. As indicated in the term "radar", that is, radio detection and ranging, a conventional radar system transmits certain bursts of radio frequency energy and detects objects based on echoes of the radio frequency bouncing off the objects within a range of the conventional radar system. The conventional Doppler radars produces the velocity data of the objects by analyzing how an object's motion has altered the frequency of the returned signal. Conventional Doppler radars are often used to detect the presence and measure the velocity of certain moving objects within ranges of aerial/nautical/terrestrial surveillance radars. However, conventional Doppler radars cannot detect any stationary target such as a human not in motion. It would be desirable to detect a stationary breathing target in various circumstances such as a search for a disaster victim hidden in debris to rescue or to detect a person hiding behind an obstruction.

SUMMARY

In accordance with aspects of the present invention, there is provided a computer-implemented method includes, for instance: separating an electric signal generated by Doppler processors of a radar into alternating current (AC) magnitudes with Doppler frequencies corresponding to absolute values between 0.1 and 4 Hz and direct current (DC) magnitudes with no Doppler frequency; generating an AC line by calculating a sum of the AC magnitudes across Doppler cells for each range cell and by running constant false alarm rate (CFAR) detector algorithm for the sum of the AC magnitudes; generating a DC line by calculating a sum of the DC magnitudes across the Doppler cells for each range cell and by running CFAR detector algorithm for the sum of the DC magnitudes; comparing an energy level difference between an energy spike in the AC line and another energy spike in the DC line with a threshold set for detecting a breathing target that is stationary; and based on ascertaining that the energy level difference between the energy spikes respective to the AC line and the DC line is greater than the threshold, detecting the breathing target that is stationary and generating an output that informs an operator of the radar on the breathing target with a range value of the breathing target from the radar.

In some instances, the method also includes: based on ascertaining that the energy level difference between the energy spikes respective to the AC line and the DC line is less than the threshold, detecting a stationary object that does not breathe and generating an output that informs the operator of the radar on the stationary object with a range value of the stationary object from the radar.

In some instances, the method also includes: obtaining a configuration message including the threshold set for detecting the breathing target that is stationary, interactively input from the operator or automatically read from a predefined system configuration parameter value as set by the operator; parsing the configuration message to extract the threshold; and applying the threshold to the comparing the energy level difference between the energy spikes in the AC line and in the DC line with the threshold.

In some instances, the method also includes: separating an AC phase from the electric signal concurrently with the separating the electric signal into the AC magnitudes and the DC magnitudes; adjusting the AC phase by adding the AC magnitudes and the DC magnitudes to reinstate the electric signal; and performing downstream signal processing upon a phase-adjusted signal resulting from the adjusting.

In accordance with another aspect of the present invention, there is provided a computer program product stored on one or more non-transitory storage media and adapted to be run on a computer processor to perform a computer-implemented method including: separating an electric signal generated by Doppler processors of a radar into alternating current (AC) magnitudes with Doppler frequencies corresponding to absolute values between 0.1 and 4 Hz and direct current (DC) magnitudes with no frequency; generating a AC line by calculating a sum of the AC magnitudes across Doppler cells for each range cell and by running constant false alarm rate (CFAR) detector algorithm for the sum of the AC magnitudes; generating a DC line by calculating a sum of the DC magnitudes across the Doppler cells for each range cell and by running CFAR detector algorithm for the sum of the DC magnitudes; comparing an energy level difference between an energy spike in the AC line and another energy spike in the DC line with a threshold set for detecting a breathing target; and based on ascertaining that the energy level difference between the energy spikes respective to the AC line and the DC line is greater than the threshold, detecting the breathing target that is stationary and generating an output that informs an operator of the radar of the breathing target with a range value of the breathing target from the radar.

In some embodiments, the computer program product also includes: based on ascertaining that the energy level difference between the energy spikes respective to the AC line and the DC line is less than the threshold, detecting a stationary object that does not breathe and generating an output that informs the operator of the radar on the stationary object with a range value of the stationary object from the radar.

In some embodiments, the computer program product also includes: obtaining a configuration message including the threshold set for detecting the breathing target that is stationary, interactively input from the radar operator or automatically read from a predefined system configuration parameter value as set by the operator; parsing the configuration message to extract the threshold; and applying the threshold to the comparing the energy level difference between the energy spikes in the AC line and in the DC line with the threshold.

In some embodiments, the computer program product also includes: separating an AC phase from the electric signal concurrently with the separating the electric signal into the AC magnitudes and the DC magnitudes; adjusting the AC phase by adding the AC magnitudes and the DC magnitudes to reinstate the electric signal; and performing downstream radar signal processing upon a phase-adjusted signal resulting from the adjusting. separating an AC phase from the electric signal concurrently with the separating the electric signal into the AC magnitudes and the DC magnitudes; adjusting the AC phase by adding the AC magnitudes and the DC magnitudes to reinstate the electric signal; and allowing downstream signal processing to use a phase-adjusted signal resulting from the adjusting.

In accordance with another aspect of the present invention, there is provided a radar system that includes, for instance: a transmitter to emit radio waves; a detector to receive the radio waves that has been reflected from an object at a distance, and to generate an electric signal corresponding to the radio waves; and a processor for processing the electric signal, including: a first functional block that separates the electric signal into alternating current (AC) magnitudes with Doppler frequencies corresponding to absolute values between 0.1 and 4 Hz and direct current (DC) magnitudes with no frequency; and a second functional block that detects a breathing target without motion based on a difference between an energy spike of an AC line and another energy spike of a DC line being greater than a threshold for detecting the breathing target that is stationary, based on processing the AC line by calculating a sum of the AC magnitudes across Doppler cells for each range cell and by running the constant false alarm rate (CFAR) detector algorithm for the sum of the AC magnitudes, and processing the DC line by calculating a sum of the DC magnitudes across Doppler cells for each range cell and by running the CFAR detector algorithm for the sum of the DC magnitudes.

In some embodiments, the radar system also includes: a user interface to receive a configuration message including the threshold for detecting the breathing target and to report a presence of the breathing target or a lack thereof, and a range value of the breathing target from the radar.

In some embodiments, the radar system also includes: a message parser to extract the threshold for detecting the breathing target from a configuration message or from predefined system configuration parameter values stored in a storage medium of the radar.

In some embodiments, the radar system also includes: a third function block that performs downstream signal processing for the electric signal based on a phase-adjusted electric signal generated by a phase adjuster, as performed after the first functional block to thereby recover the electric signal by adding the AC magnitudes and the DC magnitudes.

As defined herein a "computer readable storage medium" is defined as a tangible device that can retain and store data and instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. Computer readable program instructions may execute entirely on the user's computer, partly on the user's computer, as a stand-alone software package, partly on the user's computer and partly on a remote computer or entirely on the remote computer or server.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or another programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term "instance" as used herein refers to an example of an implementation of a method; and the term "embodiment" as used herein refers to an example of a physical implementation of an apparatus. It will be appreciated that an instance may be implemented, for example, in a computer program stored on a non-transient storage medium or a system having a suitably programmed processor or instructions stored in a memory. Also, it will be appreciated that features of a method described with reference to system, may be practiced and claimed as a method or a computer program, apart from the system; and features of a method described with reference to a method may be practiced and claimed as an embodiment of a system.

These and other aspects of the present invention will become apparent upon a review of the following detailed description and the claims appended thereto.

DETAILED DESCRIPTION

Aspects of the invention will be further illustrated with reference to the following specific embodiments. It is understood that these embodiments are given by way of illustration and are not meant to limit the disclosure or the claims to follow.

Figure 1:
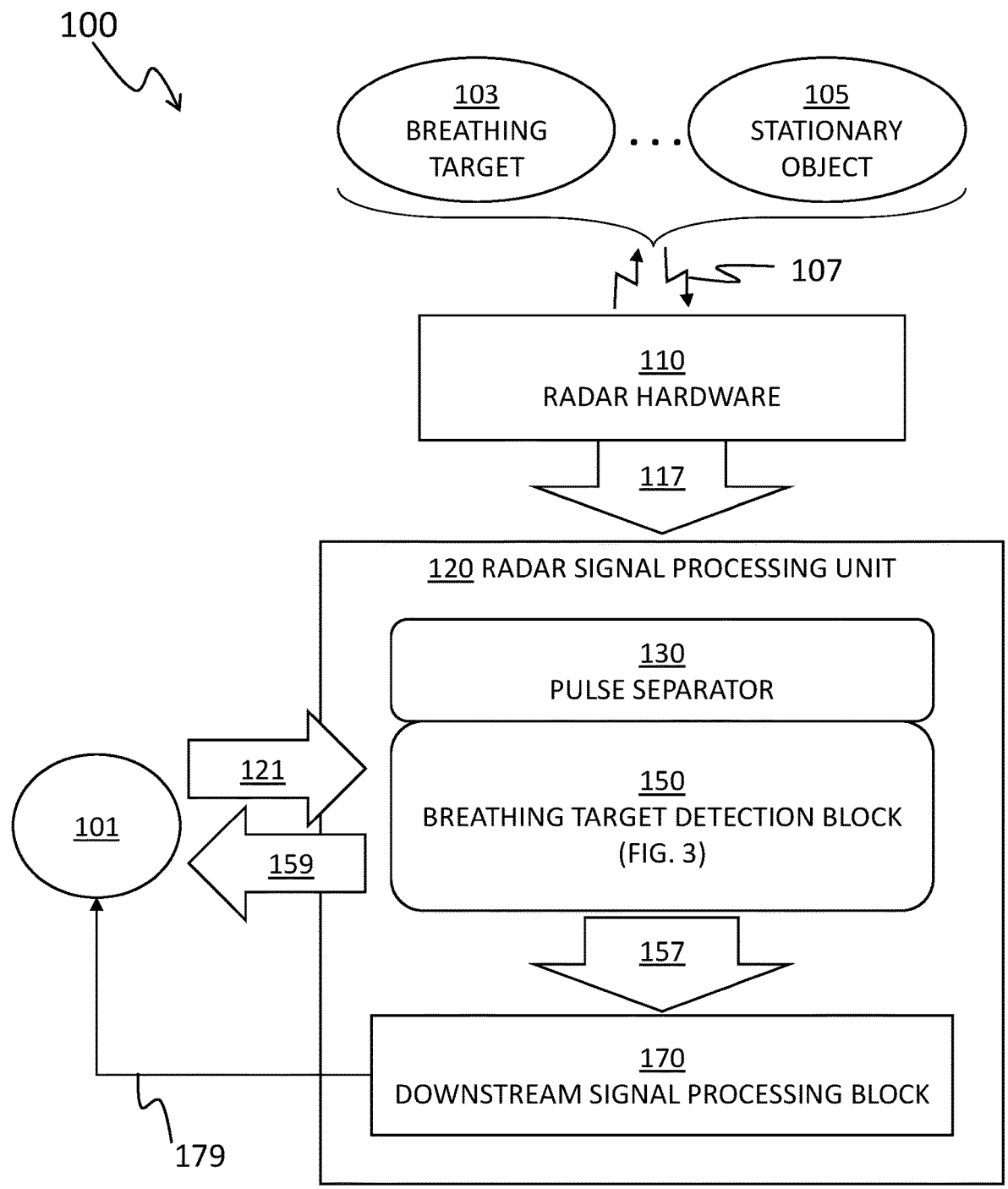
FIG. 1 is a functional block diagram of a radar system, in accordance with one or more embodiments of the present invention.

FIG. 1 is a functional block diagram of a radar system 100, in accordance with one or more embodiments of the present invention. The radar system 100 includes radar hardware 110 and a radar signal processing unit 120.

The radar hardware 110 includes a transmitter, a receiver, and an antenna to transmit radio frequency energy, hereinafter pulses, to objects in a range of the radar system 100 and to receive echoes 107 of the pulses bouncing off the objects in the range. The objects in the range include a breathing target 103 and a stationary object 105, amongst plurality of objects in the range. The radar hardware 110 also includes a circuitry that produces pulse data 117 for the radar signal processing unit 120. The pulse data 117 contain complex magnitudes for each Doppler bin at each range cell. In this specification, term "range" indicates a length of a straight line between the radar hardware 110 and a target; term "Doppler bin" indicates the output from a single Doppler filter created by an electronic circuit in the radar hardware 110 to select reflected radiofrequencies, that is, the echoes 107, within a predefined time period, corresponding to a certain range of Doppler frequencies; and term "range cell" indicates the smallest range unit the radar is capable of distinguish, commonly a distance between 20 meters and 60 meters, as ordinarily used in a technical field of radar.

The radar signal processing unit 120 of the radar system 100 processes and analyzes pulse data 117 received from the radar hardware 110 to detect the breathing target 103 based on that breathing is a movement generating echoes containing low Doppler frequencies. The radar signal processing unit 120 can be implemented as a software program to be performed by one or more processor or a hardware circuitry that performs the radar signal processing unit 120. Computer readable program instructions to execute functionalities of the radar signal processing unit 120 can be stored in one or more computer readable storage media usable by the one or more processor.

As noted above, conventional Doppler radar systems cannot distinguish the breathing target 103 that is stationary from other inanimate objects that do not breath, represented as the stationary object 105. The radar signal processing unit 120 of the radar system 100 detects the breathing target 103 by analyzing a sum of energy reflected from the breathing target 103 without requiring any new Doppler processing hardware to detect the breathing target 103.

The radar signal processing unit 120 includes a pulse separator 130, a breathing target detection block 150, and downstream signal processing block 170. The downstream signal processing will include the algorithms and techniques that typically follow radar target detection in the radar signal processing unit 120. After target detection processing is complete, results 159 are delivered to a radar operator 101 indicating whether the breathing target 103 is present and at what distance if any. The configuration of the radar signal processing unit 120 is implemented by receiving a configuration message 121. The configuration message 121 specifies how sensitive the breathing target detection would be and any particular pattern of breaths by the breathing target 103, as set by the radar operator 101. The result 159 can include amplitude graphs. A few examples of the amplitude graphs are presented in FIGS. 4-6 and corresponding descriptions.

The pulse separator 130 of the radar signal processing unit 120 calculates a magnitude and a phase of the pulse data 117 from each range cell and separates the magnitude and the phase of the pulse data 117 to prepare the magnitude of the pulse data 117 for the breathing target detection block 150. The pulse separator 130 further separates the magnitude based on specific frequencies known for human breathing, as presented in FIG. 2 and corresponding description.

The breathing target detection block 150 of the radar signal processing unit 120 processes and analyzes the magnitudes of the pulse data 117 and detects the breathing target 103 as a result. Detailed operations of the breathing target detection block 150 are presented in FIG. 3 and corresponding description.

The downstream signal processing block 170 of the radar processing unit 120 receives phase-adjusted pulse data 157 as processed by the breathing target detection block 150, which are substantially equivalent to the pulse data 117 from the radar hardware 110. The downstream signal processing block 170 generates an output as in conventional Doppler radar systems, such as target reports containing position, magnitude, and velocity information, and communicates the output to the radar operator 101, denoted as arrow 179.

In certain embodiments of the present invention, the radar signal processing unit 120 is specialized in detecting the breathing target 103 so that no conventional Doppler radar processing is required. In the same embodiments, the radar signal processing unit 120 includes the pulse separator 130 and an alternative embodiment of the breathing target detection block 150 as presented in description for FIG. 3.

Figure 2:
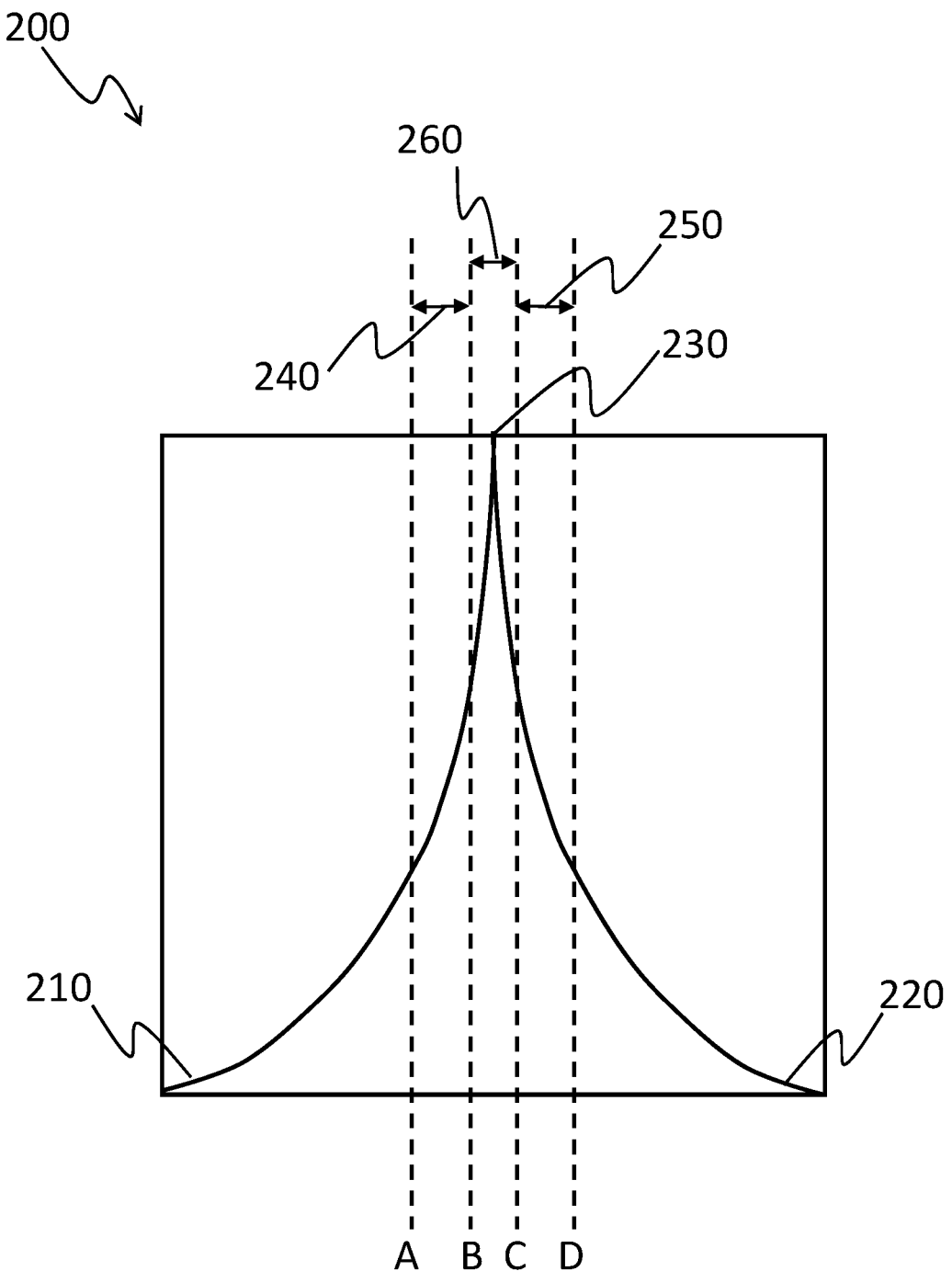
FIG. 2 depicts a Fast Fourier Transform (FFT)-shifted window using nominal Doppler frequency responses, in accordance with one or more instances of the present invention.

FIG. 2 depicts a fast Fourier Transform (FFT)-shifted window 200 using nominal Doppler responses, in accordance with one or more instances of the present invention.

Fourier transform decomposes received radar signals, the pulse data 117 of FIG. 1, into harmonic frequencies, of the signal, such that the FFT-shifted window 200 depicts spectral frequencies of the Doppler responses. A first curve 210 represents frequencies reflected from an object moving toward the radar system 100 and a second curve 220 represents frequencies reflected from an object moving away from the radar system 100. A point 230 where the first curve 210 transitions into the second curve 220 represents an object with no movement relative to the radar system 100, which has a Doppler frequency of 0 Hz.

A first area 240 between dashed lines A and B represents frequencies between 0.1 Hz and 4 Hz moving toward the radar system 100, and a second area 250 between dashed lines C and D represents frequencies between −0.1 Hz and −4 Hz moving away from the radar system 100. The first area 240 and the second area 250 would be collectively referred to as an alternating current (AC) window in this specification. The Doppler frequencies having absolute values between 0.1 Hz and 4 Hz of the AC window correspond to frequencies of human breathing.

A third area 260 between dashed lines B and C represents frequencies between −0.1 Hz and 0.1 Hz, which would be referred to as a direct current (DC) window in this specification. Any signals in the DC window would be considered to be too low to have been created by human breathing. Objects that create Doppler frequencies between −0.1 Hz and 0.1 Hz, that is, pragmatically 0 Hz, would be considered to be stationary and not breathing.

As noted above, conventional Doppler radar systems cannot distinguish the breathing target 103 that is stationary from inanimate objects that does not breathe including the stationary object 105. To detect the breathing target 103, the radar signal processing unit 120 analyzes AC and DC signals respectively and compares resulting AC and DC signals against a threshold for breathing target detection.

Figure 3:
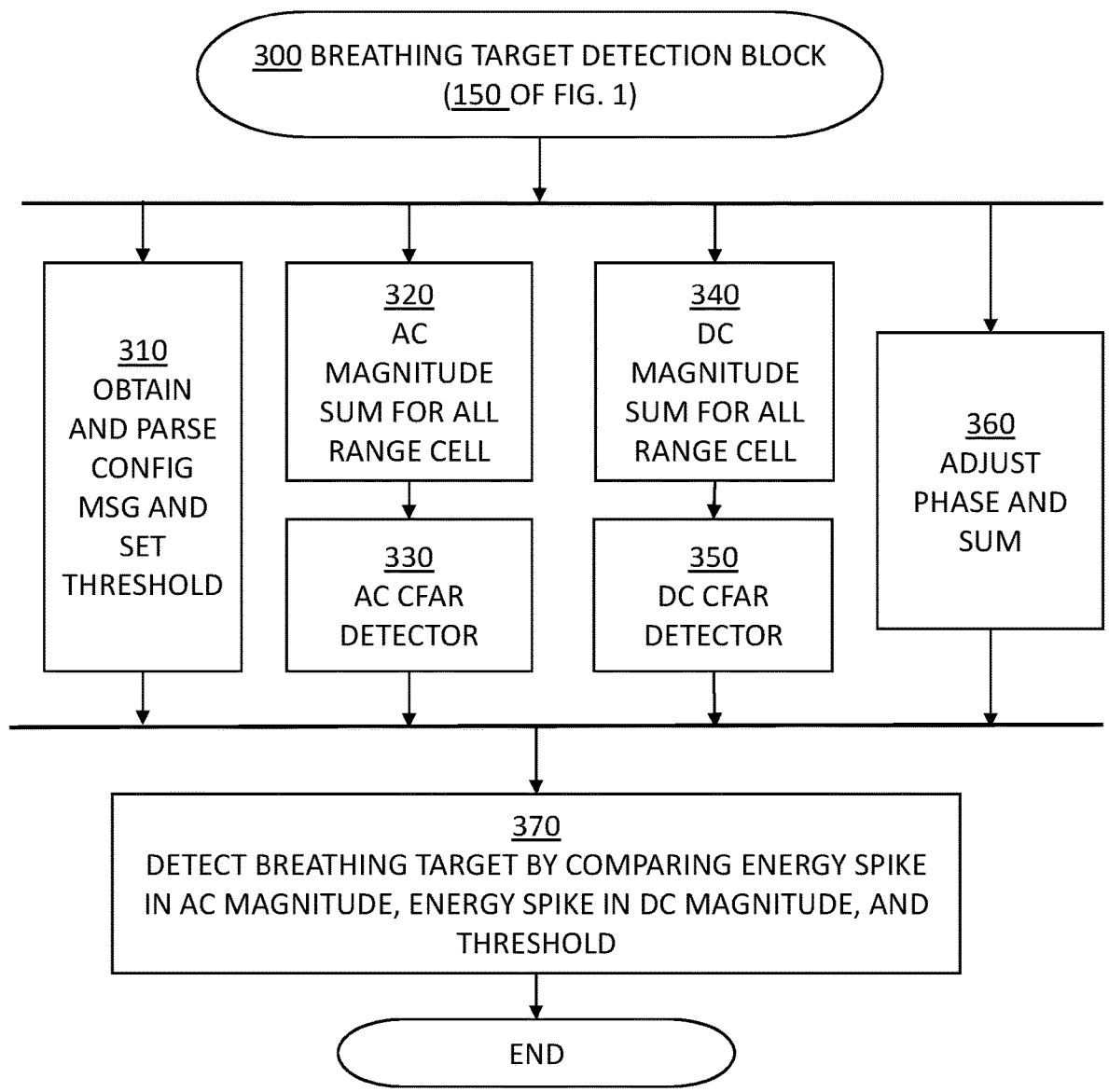
FIG. 3 depicts a flowchart of the breathing target detection block of FIG. 1, in accordance with one or more instances of the present invention.

FIG. 3 depicts a flowchart 300 of the breathing target detection block 150 of FIG. 1, in accordance with one or more instances of the present invention.

The breathing target detection block 150 performs blocks 310, 320, 340, and 360 by respective module of the breathing target detection block 150 based on respective inputs as described herein.

In block 310, a message parser of the breathing target detection block 150 obtains and parses the configuration message 121 including a threshold for breathing target detection. The threshold for breathing target detection, or the threshold, is set to control the sensitivity of the breathing target detection as performed in block 370. A lower threshold would detect minimal breathing signature with many false positives, and a higher threshold would detect less but more significant breathing signatures with more false negatives. The configuration message 121 can be automatically generated based on predefined system configuration parameter values as set by the radar operator 101 for the breathing target detection block 150 or provided interactively by the radar operator 101 by use of a user interface of the radar system 100. Then, the breathing target detection block 150 proceeds with block 370.

In certain instance of the present invention, the configuration message 121 can be set to detect only the breathing target 103 who breathes heavily with higher frequencies between 2 Hz and 4 Hz and between −2 Hz and −4 Hz, depending on the purpose of the detection. Similarly, the configuration message 121 would be set to detect the breathing target 103 with any sign of breathing to find a disaster victim who may be unconscious or asleep by using the spectrums between 0.1 and 4 Hz and between −0.1 Hz and −4 Hz. representing a whole range of breathing motion. The configuration message 121 can be set to disregard any breathing frequencies known to be animal breathing, or any specific breathing frequencies.

In block 320, an AC processer of the breathing target detection block 150 obtains AC magnitudes from the pulse separator 130 and calculates a sum of the AC magnitudes for Doppler frequencies with corresponding absolute values between 0.1 Hz and 4 Hz across Doppler cells, represented as the AC windows 240, 250 in FIG. 2. As noted above, energy from the breathing target 103 falls within a spectrum of 0.1 Hz and 4 Hz and between −0.1 Hz and −4 Hz. To extract respective ranges of objects, the AC processor iterates block 320 at each range cell. Then, the AC processer of the breathing target detection block 150 proceeds with block 330.

In block 330, the AC processer of the breathing target detection block 150 runs the constant false alarm rate (CFAR) detection algorithm to detect a spike from the sum of the AC magnitudes resulting from block 320 across all ranges of the radar system 100. The spike in the AC magnitudes can be a sign of the breathing target 103 or the stationary object 105 that does not breathe. Then, the breathing target detection block 150 proceeds with block 370.

In block 340, a DC processer of the breathing target detection block 150 obtains DC magnitudes from the pulse separator 130, filters all zero Doppler magnitudes as the DC magnitudes represented as the DC window 260 in FIG. 2, and calculates a sum of the DC magnitudes. To extract respective ranges of objects, the DC processor iterates block 340 at each range cell. Then, the DC processer of the breathing target detection block 150 proceeds with block 350.

In block 350, the DC processer of the breathing target detection block 150 runs the CFAR detection algorithm to detect a spike from the DC magnitudes resulting from block 340 across the ranges of the radar system 100. The spike in the DC magnitudes can be a sign of the stationary object 105 that does not breathe. Then, the breathing target detection block 150 proceeds with block 370.

In block 360, a phase adjuster of the breathing target detection block 150 adjusts a phase of an AC pulse and adds the AC magnitudes and the DC magnitudes, because separating the AC magnitudes and the DC magnitudes from the pulse data 117 has changed the phase of the AC pulse represented in the pulse data 117. Then, the breathing target detection block 150 proceeds with block 370.

In certain instances of the present invention where the radar system 100 is used only for detecting the breathing target 103, the phase adjuster of the breathing target detection block 150 can be omitted, if the downstream signal processing block 170 is omitted or implemented in such a way that there is no need to reinstate the phase of the pulse data 117.

In block 370, the breathing target detection block 150 detects the breathing target 103 by comparing a spike in the AC magnitudes and a spike in the DC magnitudes, and by comparing the difference between the spikes with the threshold for breathing target detection. The spike in the AC magnitudes represents a signal-to-noise ratio in the AC responses and the spike in the DC magnitudes represents a signal-to-noise ratio in the DC responses, as detected by respective CFAR detector runs in blocks 330 and 350. If the spike in the AC magnitudes and the spike in the DC magnitudes are within the threshold set in block 310, then the breathing target detection block 150 determines that a target corresponding to the spikes would be the stationary object 105, based on that the stationary object 105 such as walls and trees has significant DC energy as well as reflects any AC energy, representing residual energy from the breathing movement. If a difference between the spike in the AC magnitudes and the spike in the DC magnitudes is greater than the threshold set in block 310, then the breathing target detection block 150 determines that the target corresponding to the spikes would be the breathing target 103, based on that the breathing target 103 would barely reflect DC energy. As noted earlier and in block 310, the threshold to determine the breathing target 103 would be set empirically, based on a desired probability of detection and a probability of false alarm that is consistent with the purpose of the radar system 100.

In block 370, the breathing target detection block 150 uses the AC magnitudes resulting from block 330, the DC magnitudes resulting from block 350, and the threshold for breathing target detection resulting from block 310. Then, the breathing target detection block 150 proceeds with reporting the breathing target 103 to the radar operator 101 via a user interface and terminates processing.

In certain embodiments where the downstream signal processing block 170 is operational, the breathing target detection block 150 can send information on the breathing target 103 and/or the phase-adjusted pulse data 157 or make the same information available to the downstream signal processing block 170 prior to terminate processing. Then, the radar signal processing unit 120 proceeds with operations of the downstream signal processing block 170.

Figure 4:
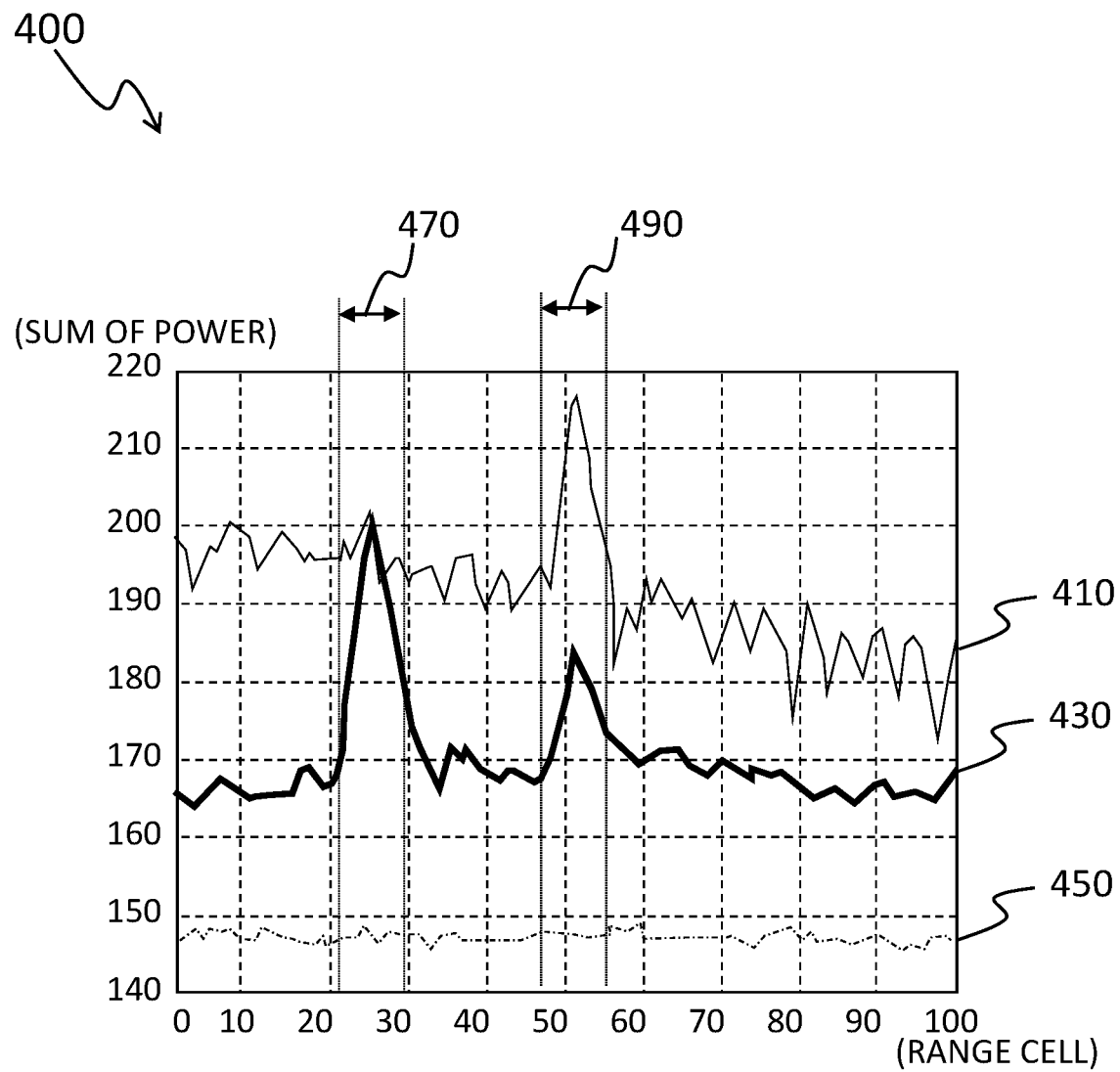
FIG. 4 depicts a first exemplary graph resulting from the breathing target detection block at the conclusion of block 370 of FIG. 3.
Figure 5:
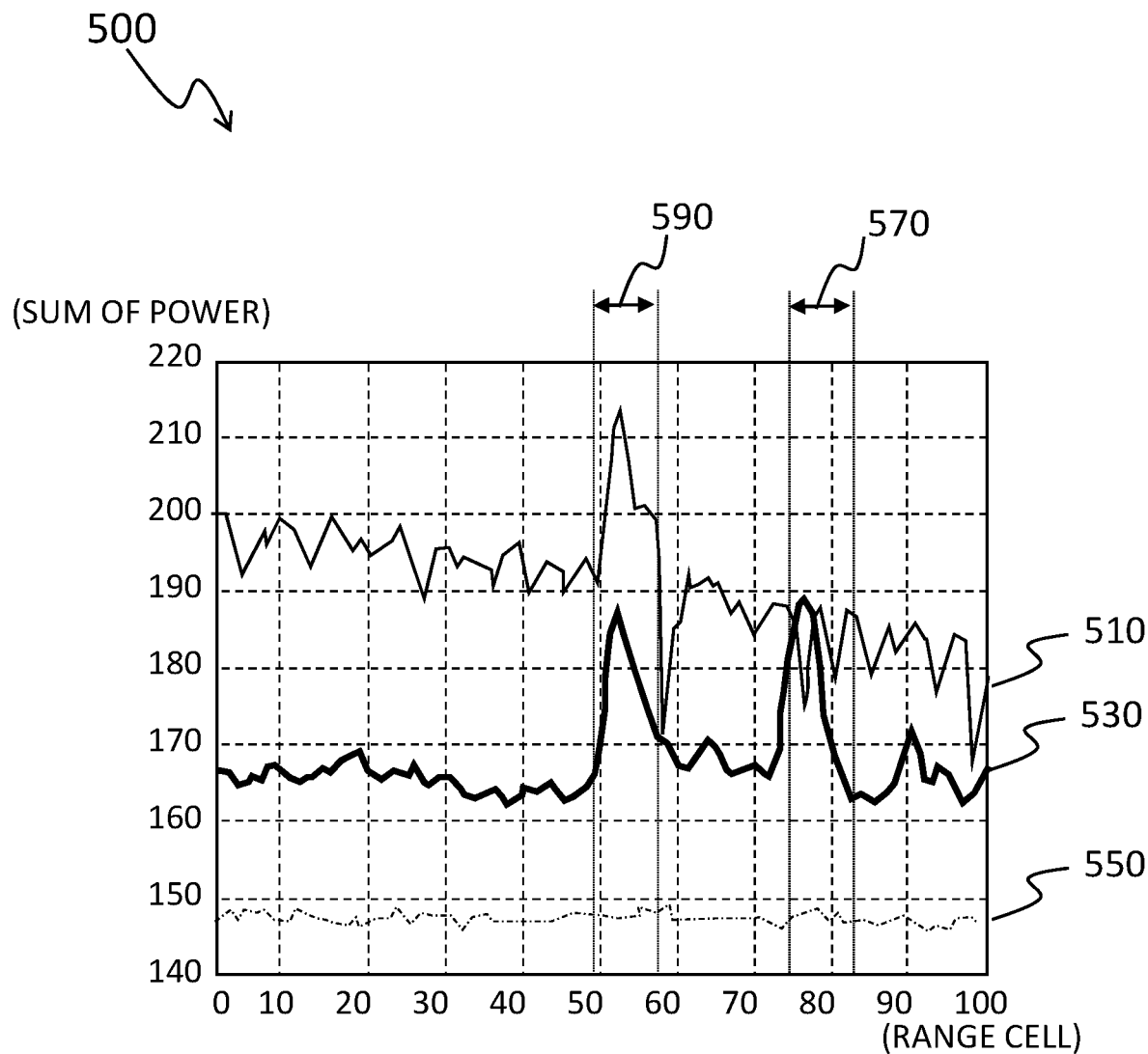
FIG. 5 depicts a second exemplary graph resulting from the breathing target detection block at the conclusion of block 370 of FIG. 3.
Figure 6:
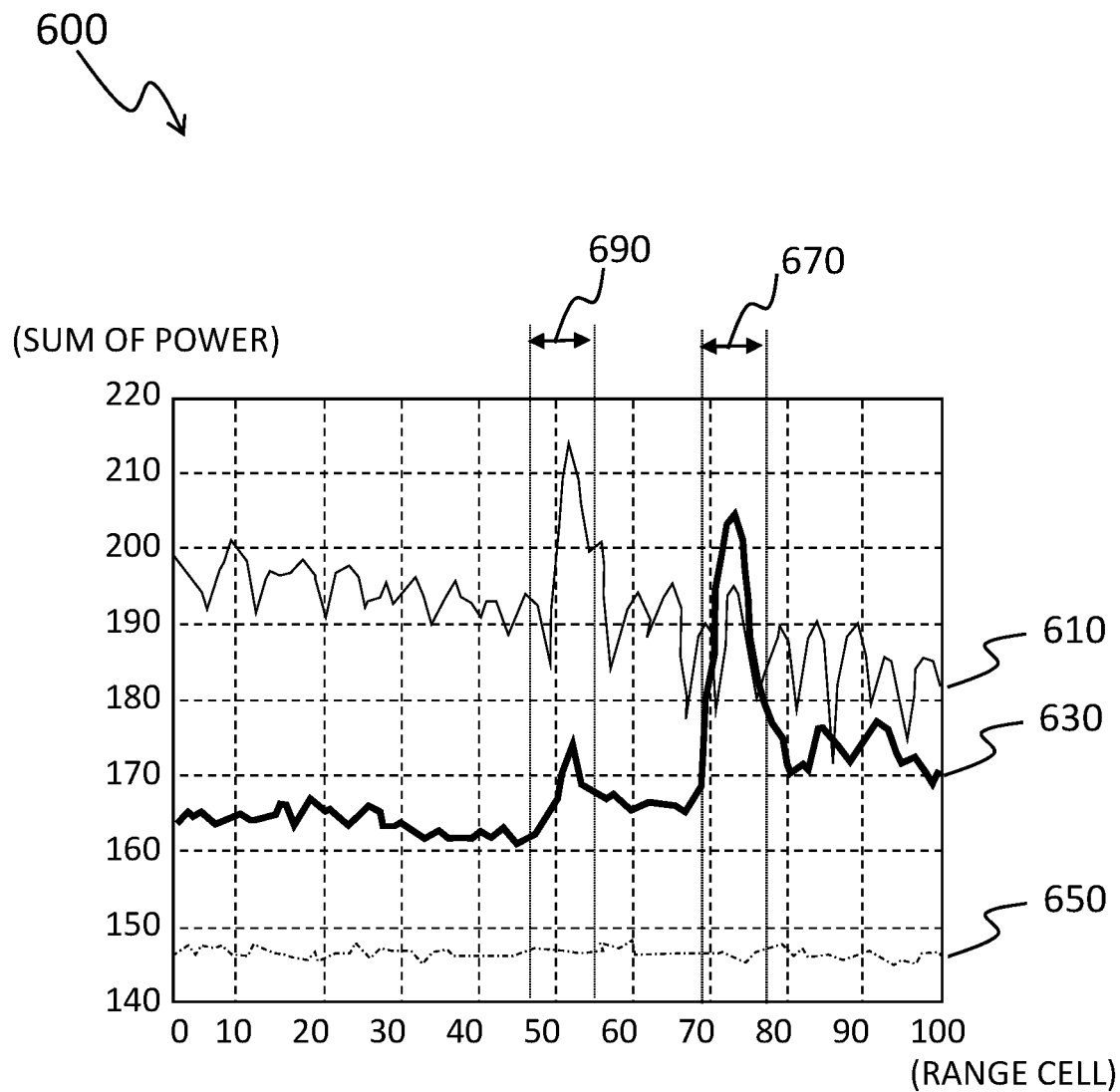
FIG. 6 depicts a third exemplary graph resulting from the breathing target detection block at the conclusion of block 370 of FIG. 3.

FIGS. 4-6 are a few examples of the amplitude graphs presenting the breathing target 103 detected by the breathing target detection block 150, in accordance with one or more embodiments of the present invention. In this specification, term "power" is interchangeable with terms "energy", "magnitude", and "amplitude". In exemplary graphs 400, 500, and 600, x-axis represents range cells in order and y-axis represents the sum of power in decibel (dB) unit. Each range cell would be 20-60 meters (m) in size, so the radar system 100 would be able to detect objects within distance of 2-6 kilometers (km) from the radar system 100. In FIGS. 4-6, the breathing target detection block 150 as described in FIG. 3 and corresponding description was performed by use of input data collected by the Standoff Moving Target Detection (MTD), Imaging and Scanning Radar (SOMISR) II radar system.

FIG. 4 depicts a first exemplary graph 400 resulting from the breathing target detection block 150 at the conclusion of block 370 of FIG. 3.

In the first exemplary graph 400, a DC line 410 is as resulting from block 350 of FIG. 3, and an AC line 430 is as resulting from block 330 of FIG. 3. A noise line 450 is also shown as resulting from the CFAR detector in blocks 330 and 350.

In the first exemplary graph 400, the AC line 430 has two spikes at a first range 470 and a second range 490. According to block 370 of FIG. 3, a first spike of the AC line 430 at the first range 470, approximately 35 dB, is compared to a first spike of the DC line 410 at the first range 470, less than 5 dB, and the breathing target detection block 150 determines the breathing target 103 is present in the first range 470, provided that the threshold is less than 30 dB. Similarly, a second spike of the AC line 430 at the second range 490, approximately 15 dB, is compared to a second spike of the DC line 410 at the second range 490, approximately 25 dB, and the breathing target detection block 150 determines the stationary object 105 is present in the second range 470, provided that the threshold is greater than 10 dB.

FIG. 5 depicts a second exemplary graph 500 resulting from the breathing target detection block 150 at the conclusion of block 370 of FIG. 3.

In the second exemplary graph 500, a DC line 510 is as resulting from block 350 of FIG. 3, and an AC line 530 is as resulting from block 330 of FIG. 3. A noise line 550 is also shown as resulting from the CFAR detector in blocks 330 and 350.

In the second exemplary graph 500, the AC line 530 has two spikes at a first range 570 and a second range 590. According to block 370 of FIG. 3, a first spike of the AC line 530 at the first range 570, approximately 20 dB, is compared to a first spike of the DC line 510 at the first range 570, less than 0 dB, and the breathing target detection block 150 determines the breathing target 103 is present in the first range 570, provided that the threshold is less than 20 dB. Similarly, a second spike of the AC line 530 at the second range 590, approximately 20 dB, is compared to a second spike of the DC line 510 at the second range 590, approximately 20 dB, and the breathing target detection block 150 determines the stationary object 105 is present in the second range 590, provided that the threshold is greater than 1 dB.

FIG. 6 depicts a third exemplary graph 600 resulting from the breathing target detection block 150 at the conclusion of block 370 of FIG. 3.

In the third exemplary graph 600, a DC line 610 is as resulting from block 350 of FIG. 3, and an AC line 630 is as resulting from block 330 of FIG. 3. A noise line 650 is also shown as resulting from the CFAR detector in blocks 330 and 350.

In the third exemplary graph 600, the AC line 630 has two spikes at a first range 670 and a second range 690. According to block 370 of FIG. 3, a first spike of the AC line 630 at the first range 670, approximately 35 dB, is compared to a first spike of the DC line 610 at the first range 670, approximately 0 dB, and the breathing target detection block 150 determines the breathing target 103 is present in the first range 670, provided that the threshold is less than 35 dB. Similarly, a second spike of the AC line 630 at the second range 690, approximately 10 dB, is compared to a second spike of the DC line 610 at the second range 690, approximately 25 dB, and the breathing target detection block 150 determines the stationary object 105 is present in the second range 690, provided that the threshold is greater than 15 dB.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A computer-implemented method comprising:
separating an electric signal generated by Doppler processors of a radar into alternating current (AC) magnitudes with Doppler frequencies corresponding to absolute values between 0.1 and 4 Hz and direct current (DC) magnitudes with no Doppler frequency;
generating an AC line by calculating a sum of the AC magnitudes across Doppler cells for one or more range cells and by running constant false alarm rate (CFAR) detector algorithm for the sum of the AC magnitudes;

generating a DC line by calculating a sum of the DC magnitudes across the Doppler cells for each range cell and by running CFAR detector algorithm for the sum of the DC magnitudes;

comparing an energy level difference between an energy spike in the AC line and another energy spike in the DC line with a threshold set for detecting a breathing target that is stationary; and based on ascertaining that the energy level difference between the energy spikes respective to the AC line and the DC line is greater than the threshold, detecting the breathing target that is stationary and generating an output that informs a user operator of the radar on the breathing target with a range value of the breathing target from the radar.

2. The computer-implemented method of claim 1, further comprising:

based on ascertaining that the energy level difference between the energy spikes respective to the AC line and the DC line is less than the threshold, detecting a stationary object that does not breathe and generating an output that informs the user of the radar on the stationary object with a range value of the stationary object from the radar.

3. The computer-implemented method of claim 1, further comprising:

obtaining a configuration message including the threshold set for detecting the breathing target that is stationary, interactively input from the user or automatically read from a predefined system configuration parameter value as set by the user;

parsing the configuration message to extract the threshold; and applying the threshold to the comparing the energy level difference between the energy spikes in the AC line and in the DC line with the threshold.

4. The computer-implemented method of claim 1, further comprising:

separating an AC phase from the electric signal concurrently with the separating the electric signal into the AC magnitudes and the DC magnitudes;

adjusting the AC phase by adding the AC magnitudes and the DC magnitudes to reinstate the electric signal; and performing downstream signal processing upon a phase-adjusted signal resulting from the adjusting.

5. One or more non-transitory computer readable storage media, storing a computer program adapted to be run on a computer processor to perform a computer-implemented method comprising:

separating an electric signal generated by Doppler processors of a radar into alternating current (AC) magnitudes with Doppler frequencies corresponding to absolute values between 0.1 and 4 Hz and direct current (DC) magnitudes with no frequency;

generating a AC line by calculating a sum of the AC magnitudes across Doppler cells for one or more range cells and by running constant false alarm rate (CFAR) detector algorithm for the sum of the AC magnitudes;

generating a DC line by calculating a sum of the DC magnitudes across the Doppler cells for each range cell and by running CFAR detector algorithm for the sum of the DC magnitudes;

comparing an energy level difference between an energy spike in the AC line and another energy spike in the DC line with a threshold set for detecting a breathing target; and based on ascertaining that the energy level difference between the energy spikes respective to the AC line and the DC line is greater than the threshold, detecting the breathing target that is stationary and generating an output that informs a user of the radar of the breathing target with a range value of the breathing target from the radar.

6. The one or more non-transitory computer readable storage media of claim 5, further comprising:

based on ascertaining that the energy level difference between the energy spikes respective to the AC line and the DC line is less than the threshold, detecting a stationary object that does not breathe and generating an output that informs the user of the radar on the stationary object with a range value of the stationary object from the radar.

7. The one or more non-transitory computer readable storage media of claim 5, further comprising:

obtaining a configuration message including the threshold set for detecting the breathing target that is stationary, interactively input from the radar user or automatically read from a predefined system configuration parameter value as set by the user;

parsing the configuration message to extract the threshold; and applying the threshold to the comparing the energy level difference between the energy spikes in the AC line and in the DC line with the threshold.

8. The one or more non-transitory computer readable storage media of claim 5, further comprising:

separating an AC phase from the electric signal concurrently with the separating the electric signal into the AC magnitudes and the DC magnitudes;

adjusting the AC phase by adding the AC magnitudes and the DC magnitudes to reinstate the electric signal; and performing downstream radar signal processing upon a phase-adjusted signal resulting from the adjusting.

9. A radar system, comprising:

a transmitter to emit radio waves;

a detector to receive the radio waves that has been reflected from an object at a distance, and to generate an electric signal corresponding to the radio waves; and a processor for processing the electric signal, comprising:

a first functional block that separates the electric signal into alternating current (AC) magnitudes with Doppler frequencies corresponding to absolute values between 0.1 and 4 Hz and direct current (DC) magnitudes with no frequency; and a second functional block that detects a breathing target without motion based on a difference between an energy spike of an AC line and another energy spike of a DC line being greater than a threshold for detecting the breathing target that is stationary, based on processing the AC line by calculating a sum of the AC magnitudes across Doppler cells for one or more range cells and by running the constant false alarm rate (CFAR) detector algorithm for the sum of the AC magnitudes, and processing the DC line by calculating a sum of the DC magnitudes across Doppler cells for each range cell and by running the CFAR detector algorithm for the sum of the DC magnitudes.

10. The radar system of claim 9, further comprising:

a user interface to receive a configuration message including the threshold for detecting the breathing target and to report a presence of the breathing target or a lack thereof, and a range value of the breathing target from the radar.

11. The radar system of claim 9, further comprising:
a message parser to extract the threshold for detecting the breathing target from a configuration message or from predefined system configuration parameter values stored in a storage medium of the radar.

12. The radar system of claim 9, further comprising:
a third function block that performs downstream signal processing for the electric signal based on a phase-adjusted electric signal generated by a phase adjuster, as performed after the first functional block to thereby recover the electric signal by adding the AC magnitudes and the DC magnitudes.

* * * * *